Inventors
MEHMET SAHABETTIN ERGENC
FORTUNAT HARTMANN
BY
Kenyon & Kenyon Reilly Carr & Chapin
ATTORNEYS United States Patent Office  3,745,050
Patented July 10, 1973

3,745,050
PROCESS AND APPARATUS FOR ABSTRACTING HEAT FROM A FLOW OF GAS
Mehmet Sahabettin Ergenc, Zolligerberg, Zurich, and Fortunat Hartmann, Zurich, Switzerland, assignors to Sulzer Brothers, Ltd., Winterthur, Switzerland
Filed June 8, 1970, Ser. No. 44,179
Claims priority, application Switzerland, June 23, 1969, 9,567/69
Int. Cl. F24f 3/14
U.S. Cl. 165—1                                5 Claims

ABSTRACT OF THE DISCLOSURE

The dry flow of cool gas which is to be heated in the heat exchanger by the flow of warm moist gas is injected with liquid prior to or during the heat exchange period in order to extract more heat for vaporization of the liquid from the warm gas flow. The liquid injection can be carried out in one or more steps so that the heat exchange follows the graphic representations of FIG. 2 or 4.

---

The invention relates to a process and apparatus for abstracting heat from a flow of gas and, more particularly, to a process and apparatus for abstracting heat from a flow of gas in a heat exchanger in order to cool the gas flow.

It has been known that if a warm flow of gas, charged or saturated with liquid in vapor form, for example, waste moist air from an air-conditioning installation, is brought into mutual heat-exchange with a relatively dry cold flow of gas, for example, winterlike cold fresh air, for the purpose of abstracting as much heat as possible from the warm gas, the proportion of heat which can be abstracted from the flow of warm moist gas, during the heat recovery period is relatively small. This is because a considerable part of the heat-content of the warm moist gas is bonded in the form of the vaporization energy of the liquid-vapor contained in the gas. As a result, at the most, only a small portion of this heat-content can be abstracted by a dry gas that becomes heated.

Figure 1:
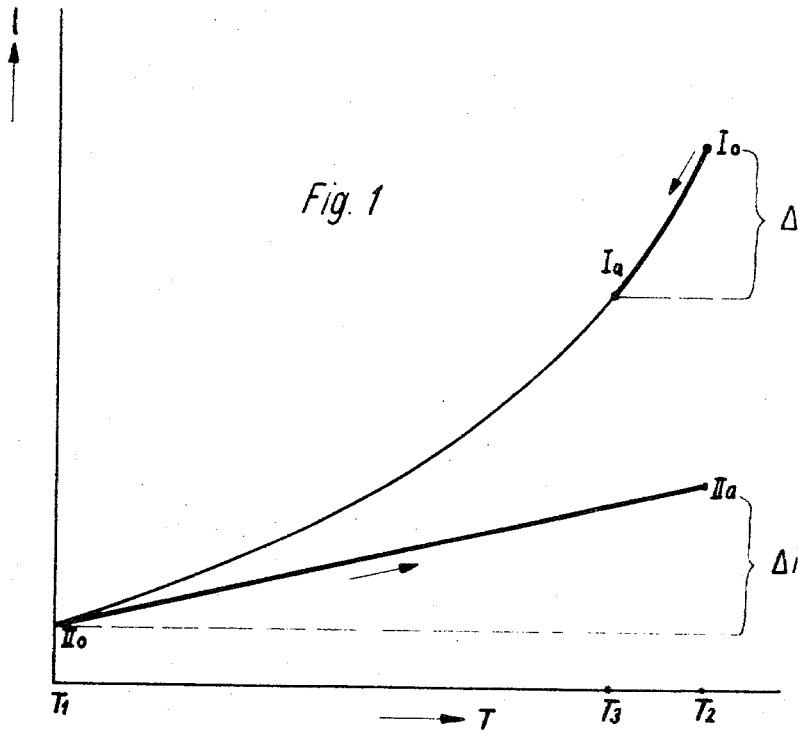

This can be explained by referring to FIG. 1 wherein the gas temperature T is plotted as the abscissae and the gas heat content is plotted as ordinates. The temperature of the gas flow I that is to be cooled down is, prior to the heat-exchange, at $T_2$, and the temperature of the gas flow II that becomes heated is at $T_1$. Making the theoretical assumption of complete heat exchange, the flow II can become heated to a maximum temperature of $T_2$, whereby the differential heat absorption per degree of temperature rise, $di/dT$, for dry gas is constant throughout the temperature range. The flow II which is being heated is therefore capable of absorbing only the heat-content $\Delta i_a$, until the temperature $T_2$ (the initial temperature of the flow I prior to the heat exchange) is attained. However, the flow I can be cooled only to a temperature $T_3$ (as shown by the thicker line of curve I), during the heat exchange. As a result, the flow I gives off only about one third of its heat content which heat content is removed on the basis of the fundamental temperatures $T_1$ and $T_2$. This is based on the fact that the vapor-containing flow I (whose $di/dT$ because of the partly-condensing vapor is a function of the temperature, and therefore is not constant) loses along with the detectable heat which, at $c_p=$a constant, is proportional to the temperature, the latent heat of the quantity of liquid-vapor condensed out of the flow I and which cannot be absorbed to a corresponding degree by a dry gas-flow II.

Accordingly, it is an object of the invention to increase the quantity of heat to be abstracted from a warm flow of gas which contains or is saturated with vapor, by means of a second flow of relatively dry gas that becomes heated. Briefly, the invention provides a process and apparatus in which a flow of gas which is to abstract heat from another flow of gas is supplied at least once with liquid before or during the heat exchange between the flows of gas. The process is carried out so that the supplied liquid is at least partially vaporized as the temperature of the gas flow in which the liquid is supplied rises. The heat necessary to cause vaporization of the liquid is supplied at least partly through the condensation of the liquid vapor or moisture in the gas flow to be cooled.

In accordance with the invention, the gas flow that is to be heated may be saturated or supersaturated with liquid. If the gas flow that is to be heated is supersaturated with liquid, it is possible to reduce or avoid in the heat exchanger separation and deposition of substances, such as salts, eventually dissolved in the liquid, even if the liquid is partially vaporized. It is moreover possible to supply the liquid in portions and at places of different temperature to the gas flow that is to become heated so that it is not necessary to supply sufficient liquid each time for the gas flow at these places to become supersaturated.

Further, the quantity of heat abstracted from the gas flow which is to be cooled can be increased if the liquid supplied to the gas flow becoming heated is precooled. This precooling is advantageously effected by the condensate separated out of the cooled gas flow.

In one embodiment, the invention can be utilized where both gas flows belong to a common circuit e.g. flowing in a closed circuit through at least one cold and through at least one warm exchange-section of a bithermal isotope-concentrating unit.

In this case, in order not to disturb the exchange reactions, or the impoverishment and enrichment process, it is advantageous if the liquid which is to be brought into the gas flow to become heated is removed at that place at which the heated second gas flow becomes fed into the hot exchange section, and/or when the condensate separated from the cooled-down first gas flow is returned at that place, at which the first gas flow to become cooled is removed from the hot exchange section.

It is furthermore advantageous if the liquid supplied to the gas flow becoming heated is of the same physical composition as that of the liquid vapor contained in the gas flow to be cooled. That is, for example, if water is used as the supplied liquid, then the gas flow to be cooled contains water-vapor. In this way, the evaporation heat and the condensation heat are equal per unit of quantity. It obviously also is possible to supply to the gas being heated a liquid of higher vaporization heat than the condensation heat contained in the vapor of the gas to be cooled, so that either the quantity of liquid to be added is lessened, or the quantity of heat abstracted from the cooled gas flow is increased.

The apparatus for carrying out the invention is characterized in that, in the flow paths for the gas becoming heated and/or in at least one heat-exchanger for the transfer of heat from the one gas flow to the other gas flow, means are provided by which the liquid can be brought into the gas flow becoming heated. This means can constitute a regulating device by means of which, as a function of the moisture content of the gas flow which has been heated in the heat-exchanger, the quantity of liquid to be brought into this gas flow is regulated.

In one embodiment the heat-exchanger is disposed in the closed circuit between a hot exchanger-tower and a cold exchange-tower of bithermal isotope concentrating installation.

In order to carry out a stagewise addition of the liquid into the gas flow becoming heated, the heat-exchanger is divided up into a number of heat-transfer sections connected in series, between which sections means are provided for supplying a liquid into the gas flow becoming heated.

In order to precool the liquid to be brought into the gas flow to become heated, the condensate separated out of the cooled-down gas flow is conveyed in heat-exchange relation to the liquid in another heat exchanger.

Figure 4:
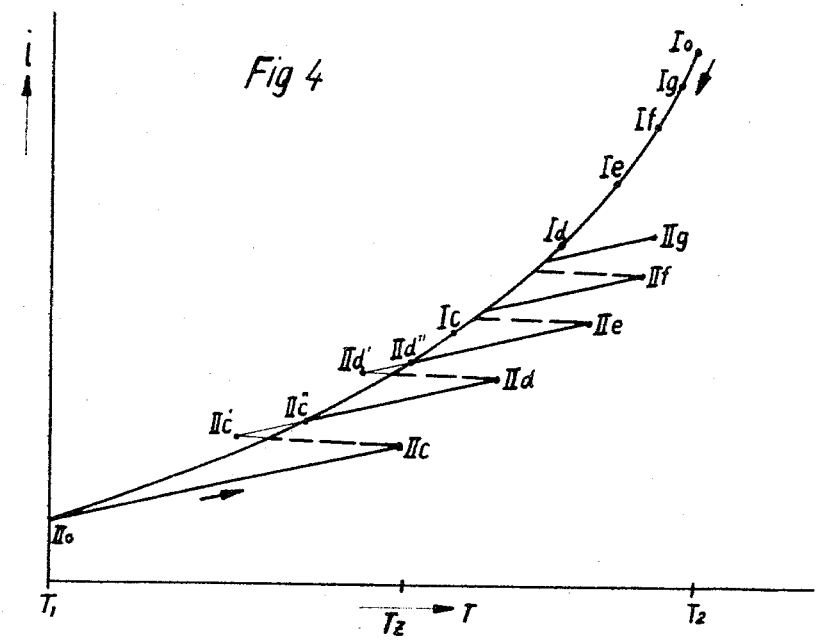
Figure 2:
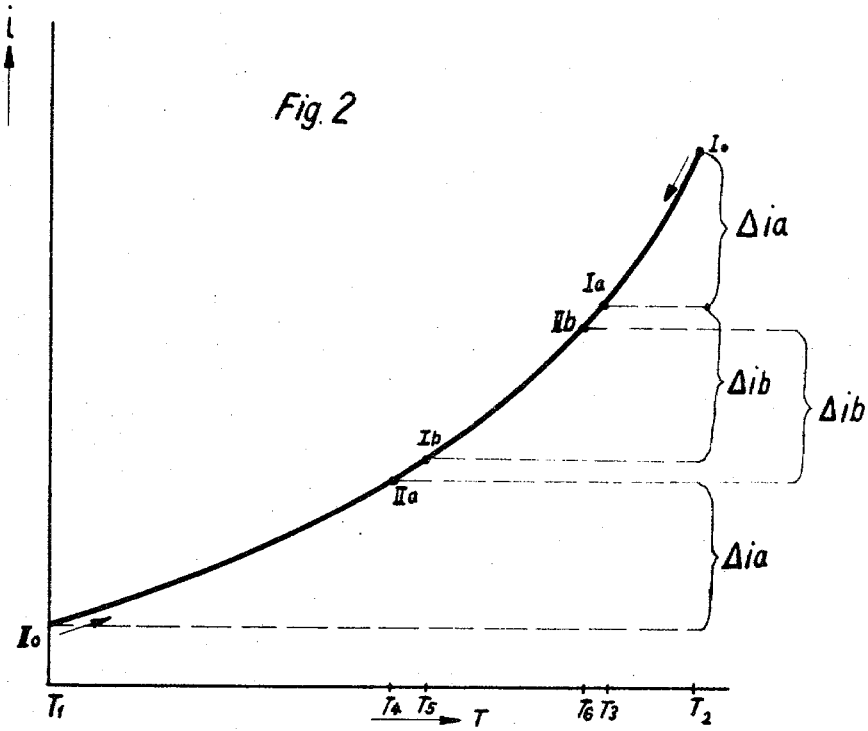
Figure 3:
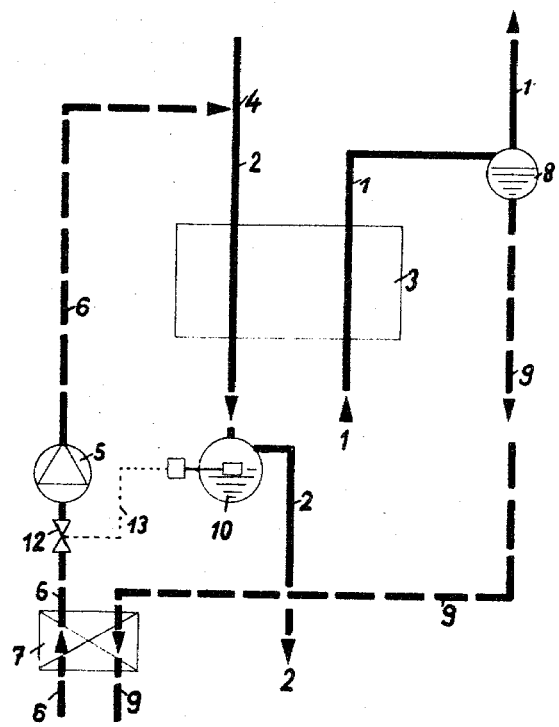
Figure 5:
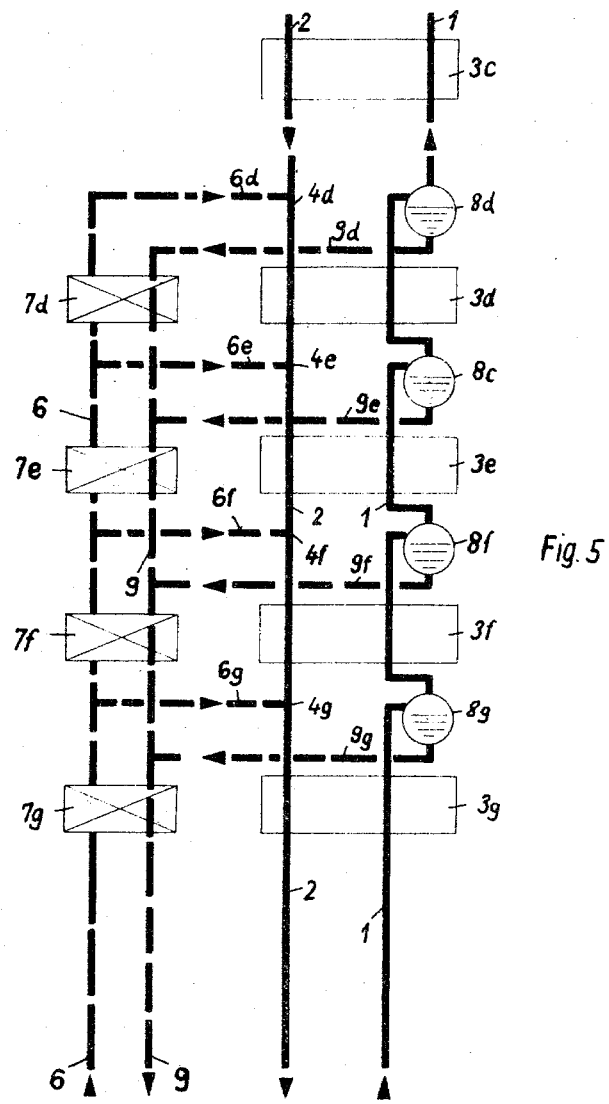
Figure 6:
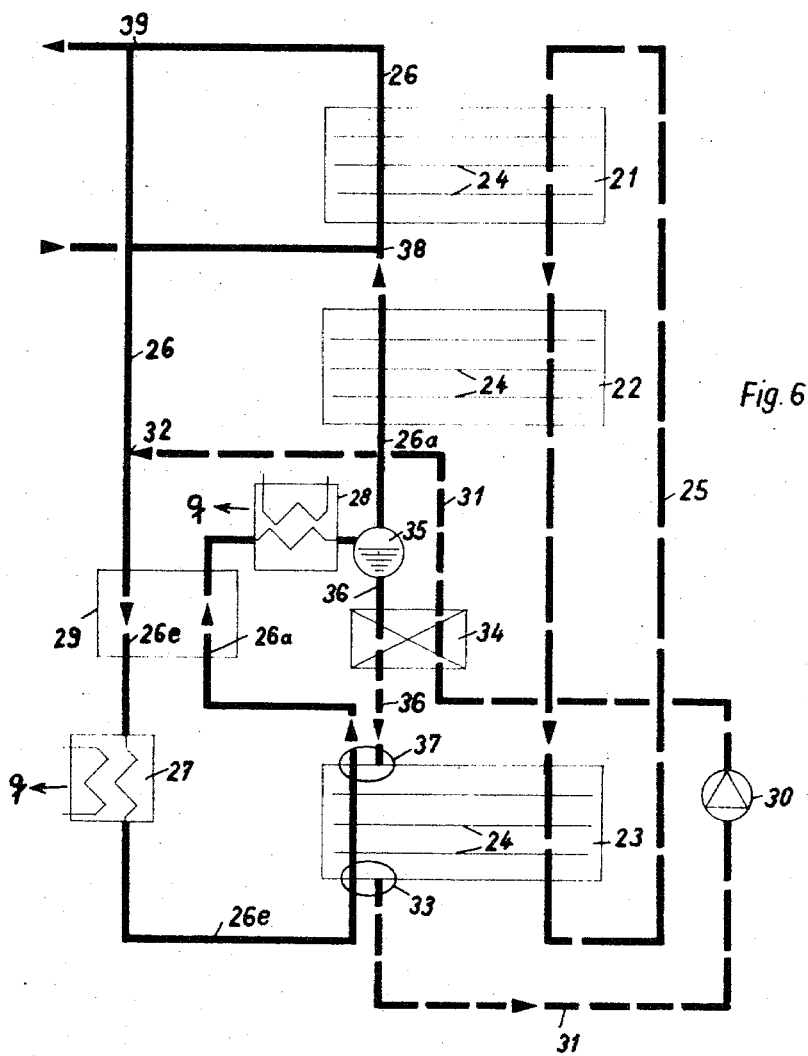

These and other objects and advantages of the invention will become more apparent from the following detailed description and appended claims taken in conjunction with the accompanying drawings in which:

FIG. 2 graphically illustrates in a representation similar to that of FIG. 1 a process of the invention in which liquid is added before the heat exchange and in which the gas flow after the heat exchange is approximately saturated with liquid;

FIG. 3 schematically illustrates an apparatus of the invention for carrying out the process of FIG. 2;

FIG. 4 graphically illustrates a modified process according to the invention in which the liquid is added in portions beyond the first heat-exchanging section;

FIG. 5 schematically illustrates an apparatus for carrying out the process illustrated in FIG. 4; and FIG. 6 schematically illustrates an apparatus of the invention in a bithermal isotope-concentrating plant.

Referring to FIGS. 2 and 3 prior to the heat exchange between a hot gas flow I to be cooled and a cool gas flow II to be heated, a quantity of liquid is introduced into the gas flow II to be heated, for example, by the aid of overpressure injection. The quantity of injected liquid is sufficient to supersaturate the gas flow II prior to the heat exchange to such a degree that after the heat exchange the gas flow is approximately at its saturation limit. The supersaturated flow II upon entry into the heat-exchanger 3 (FIG. 3) is at a temperature $T_1$, while the flow $I_0$, likewise saturated with liquid-vapor, enters into the heat-exchanger 3 at a temperature $T_2$. Because the heat-exchange occurs entirely between the two flows $I_0$ and $II_0$ saturated with liquid, the separate curves I and II coincide at this example.

As was explained in connection with FIG. 1, without an addition of liquid into the gas flow II becoming heated during the heat exchange with the gas flow I becoming cooled, only the heat content amounting to $\Delta i_a$ would be transferred from the one flow to the other and the cooling of the flow I down to the temperature $T_3$ (point Ia) and the corresponding heating of flow II up to temperature $T_4$ (point IIa) would occur.

However, as a portion of the liquid brought into the flow II becomes evaporated continuously during the heat exchange in accordance with the heat energy absorbed, whereby the evaporation heat necessary is likewise abstracted from flow Ia a supplementary quantity of heat $\Delta i_b$ is successfully abstracted from flow I. Thus, this flow I becomes cooled down to the temperature $T_5$, while the flow II at the same time becomes heated to the temperature $T_6$.

The improvement in heat recovery obtained is clearly visible from FIG. 2, and is indicated by the supplementary quantity $\Delta i_b$ exchanged, consisting of an augmented abstraction of heat from flow I. Of course, this heat can be supplied to flow II for further utilization.

Referring to FIG. 3, the heat exchanger 3 is traversed from bottom to top by a gas flow I which has to be cooled and is saturated with a liquid vapor, for example, water-vapor, while a gas flow 2 becoming heated flows in the top to the bottom. The gas flow 2 is relatively dry upstream of the heat exchanger 3 and a certain quantity of liquid is supplied to the gas flow 2 at a place 4 before entry into the exchanger 3. The supplied liquid flows out of storage tank (not shown) and is delivered by a pump 5 through a conduit 6 connected into the conduit conveying the gas flow 2.

In order that the flow 2 may not become heated up by the added liquid before the abstraction of heat from flow I, the supplied liquid can be precooled in another heat-exchanger 7. In order to carry out the precooling, use is made of condensate separated out of the cooled flow I beyond the exchanger 3 in a separator 8. In order to prevent the condensate to flow into the heat exchanger 1, a conduit 9 is connected between the separator 8 and the heat-exchanger 7 is to pass the condensate into a heat exchange with the liquid in the conduit 6 and to then flow out of the apparatus. The condensate may, of course, be conveyed into the storage tank (not shown) out of which the liquid to be supplied to flow 2 is taken. After leaving the heat-exchanger 3, the heated flow 2 first passes through a separator 10 in which excess liquid, that is, the overquantity of liquid supplied is separated out. A liquid-level regulator 11 is disposed in the separator 10 to act on a valve 12 in the conduit 6, through the intermediary of the signal-conduit 13, shown by a line of dots. The regulator 11 and valve 12 serve to regulate the quantity of liquid in the conduit 6 leading to the place 4 as a function of the excess liquid separated out of the flow 2. This regulation is advantageously done in such a way that the heated gas flow 2 is continuously at approximately its saturation limit.

It should also be mentioned that in FIG. 3, and also in the following FIGS. 5 and 6, the gas flows are shown by solid lines regardless of whether they are dry or contain vapor or are supersaturated; the liquid flows are represented by dashed lines and signal lines are shown dotted.

Referring to FIGS. 4 and 5, liquid can also be supplied to the gas flow II during the exchange of heat with the gas flow I and II as a function of the temperature T; while FIG. 5 shows a corresponding apparatus having a plurality of heat-exchange sections 3c to 3g.

In the first heat exchange section 3c, FIG. 5, at temperature $T_1$ the saturated gas flow II first becomes heated to a first intermediate temperature $T_z$ and becomes superheated which in the plotting of the curve section $II_0$–$II_c$ of FIG. 4 is shown as a straight line. Upstream of the first supply place 4d (FIG. 5) for the liquid the gas flow II is in the condition indicated in FIG. 4 by IIc. The first supply, for example, the injection of a certain quantity of liquid then occurs at the place 4d through which the flow II is precooled by the vaporization heat and at the same time becomes supersaturated with liquid. The condition of the gas flow 2 after the injection of liquid would correspond, upstream of the next heat-exchange section 3d, to the nonrealizable condition II'c.

The flow I thus has a heat content $\Delta i_c$ abstracted in section 3c. This corresponds to the vertical spacing between the points Id–Ic. The point Ic represents the final condition of the flow I attainable in the heat-exchanger 3 shown in FIG. 5.

A renewal heating of the flow II is effected in section 3d by means of the gas flow I whereby the heat abstracted from this flow I in section 3d is first made use of as vaporizing heat for the residual liquid present in flow II. The flow II thus, at point II"c, reaches the saturation line, and becomes superheated through additional abstraction of heat out of flow I until reaching the condition IId, in which the flow II leaves section 3d. The heat abstracted from flow I in section 3d again corresponds to the vertical spacing of the points Ie–Id.

By injecting liquid at the place 4e, flow II is converted into condition IId', in order to arrive at the next heat-exchange section 3e in condition IIe, while, at the same time, flow I is cooled from If to Ie.

By liquid injections made at the locations 4f and 4g, and through intermediate heatings in the section 3f and 3g, the flow II finally reaches the end-condition IIg, while the flow I undergoes the initial cooling from $I_0$ to $I_f$.

The individual sections 3g to 3c are, as above, provided with liquid-separators 8g to 8e in the flow out which the liquid condensed from the flow I is carried away through conduits 9g to 9d. These conduits 9g to 9d have outlets into a common carry-away conduit 9 for the condensate, which is conducted through heat-exchangers 7g to 7d and there is used for the precooling of the liquid in conduit 6 to be injected into the flow 2 at the locations 4g to 4d. In each case, the cold condensate flows counter to and abstracts heat from the liquid to be injected and flowing in conduit 6. The injected liquid arrives by way of branch conduits 6g to 6d at the individual injection locations 4g to 4d. This liquid can once more be taken from a storage tank (not shown) into which, if desired, the condensate can be run from the conduit 9.

The pumping mechanisms for pumping the liquids, and also the regulatory devices for metering the quantity of liquid injected at each injection location, are for greater clarity omitted from FIG. 5.

Referring to FIG. 6 the flows which are caused to interchange heat can be used to form the closed circuit of a gaseous phase in a known bithermal isotope-concentrating plant. This plant consists of two cold exchange-towers 21 and 22, which are, for example, at a temperature $t_1 = -50°$ F., and a hot exchange tower 23 at a temperature $T_2$ of $+50°$ F. Each of the exchange towers 21, 22, and 23 has a number of floors 24, of which only a few are shown schematically.

The towers 21, 22, and 23 are traversed by a liquid phase, for example, ammonia in a circuit 25, a counter-flowing gas phase 26, for example, of hydrogen or of a gas containing hydrogen. The gas phase 26, taken in the direction in which the gas phase 26 flows, requires heating between the towers 21 and 23 from $-50°$ C. to $+50°$ C., and corresponding to this must be cooled from $T_2$ down to $T_1$ between the towers 23 and 22. The branch 26e of the gas flow 26 coming out of the tower 21 and having to be heated is relatively dry; while the branch-flow 26a which has to be cooled down is saturated with hot liquid out of tower 23.

In order to keep, the quantity of heat to be supplied from the exterior into the heat-source 27 of the branch 26e, and the quantity of heat to be carried away to the exterior out of the hot flow 26a into the "cold" source 28 as small as possible, the heat exchange between the two branch-flows 26a and 26e, in the heat-exchanger 29 is as complete as possible.

Therefore, a metered quantity of liquid, in this case ammonia is introduced into the cold gas flow 26, which is to be heated, by the aid of a pump 30 through conduit 31 running to the location 32. In order to prevent disruption of the exchange reaction or the impoverishment and enrichment processes in the isotrope-concentrating plant by a liquid not having a concentration of deuterium adapted to the exchange process, the liquid to be injected is taken from a location 33 of the hot exchange tower 23 at which the gas flow 26e, after being heated in the heat exchanger 29 and the heat-source 27, enters into the tower 23.

As has been described in the foregoing, the liquid to be injected is taken from the hot exchange tower 23 and is precooled in order to avoid a premature supply of heat to the branch flow 26e, which is to be heated, by the hot liquid which would otherwise impair the possible abstraction of heat from the flow 26a, to this end, the conduit 31 runs through a heat-exchanger 34 in which the liquid which is to be injected gives off a part of its heat content to the cold condensate separated from the to-be-cooled branch flow 26a during cooling-down in the heat exchanger 29. This condensate is separated from the cold flow 26a in a separator 35, flows through a conduit 36, which likewise passes through the heat-exchanger 34 and returns into the hot exchange tower 23. For the reasons set forth above in connection with the location 33 for the removal of the liquid to be injected, the conduit 36 has an outlet into the tower 23 at a location 37 at which the hot gas flow 26a leaves its tower 23.

At the locations 38 and 39, respectively the gas flow 26 is supplied as feed with a deuterium-containing gas, for example with hydrogen which has been pre-enriched with deuterium or with natural hydrogen, or is discharged from an impoverished gas respectively. The removal of the product, and the resupply out of or into the concentrating plant may be accomplished from the ammonia circuit between the two towers 22 and 23; the removal and resupply of the product is not shown.

What is claimed is:

1. A process of abstracting heat from a flow of hot gas having a liquid vapor content in a bithermal isotope-concentrating plant having at least one cold exchange section and one hot exchange section comprising the steps of
    passing the flow of hot gas into heat exchange relation with a second flow of dry cooler gas within a common circuit passing through said exchange sections, said heat exchange occurring after said flow of hot gas passes from said hot exchange section and prior to entry into said cold exchange section; and
    supplying said second flow gas with liquid prior to or during heat exchange between said gases whereby the supplied liquid is at least partly vaporized upon heating of said second flow of gas while the liquid vapor of said flow of hot gas is condensed.

2. A process as set forth in claim 1 which further comprises the steps of removing condensate from the first flow of gas and passing the condensate into the heat exchange relation with the supplied liquid to precool the supplied liquid.

3. A process as set forth in claim 1 which further comprises the step of removing liquid from the hot exchange section where the second flow of gas which has been heated by the first gas flow enters the hot exchange section and of injecting the liquid into the second flow of gas.

4. A process as set forth in claim 1 which further comprises the step of removing condensate from the first flow of gas after heat exchange and of returning the condensate to the hot exchange section where the first gas flow leaves the hot exchange section.

5. A process as set forth in claim 1 wherein the supplied liquid is of the same physical composition as the liquid vapor contained in the first flow of gas.

References Cited

UNITED STATES PATENTS 3,274,752    9/1966    Huyghe et al. _____ 165—1

CHARLES SUKALO, Primary Examiner

U.S. Cl. X.R.

165—19